Feb. 3, 1970   J. R. POWELL ET AL   3,493,448
METHOD OF SPLICING PHOTOGRAPHIC FILM
Filed May 31, 1968   2 Sheets-Sheet 1

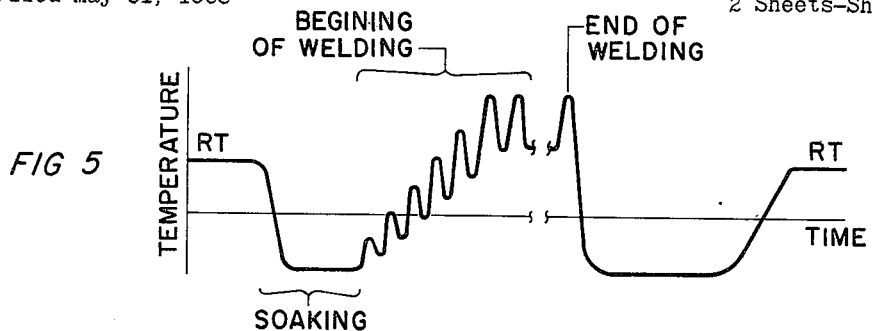
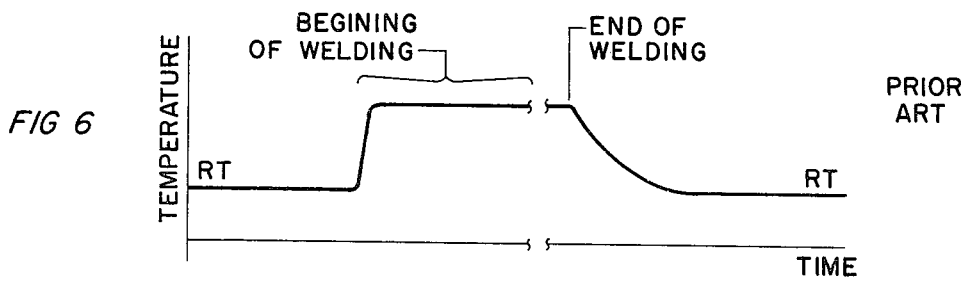
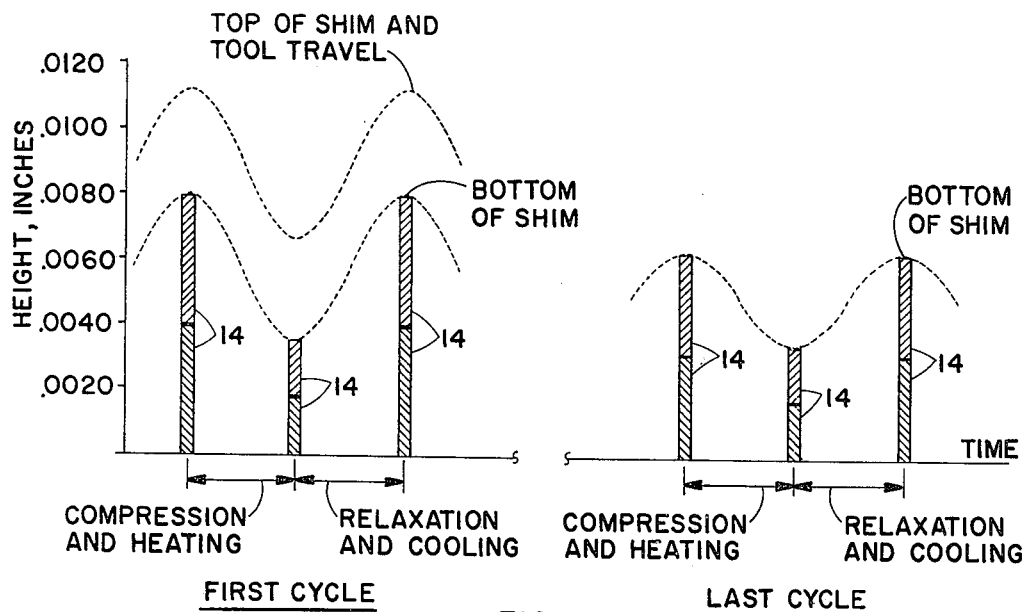
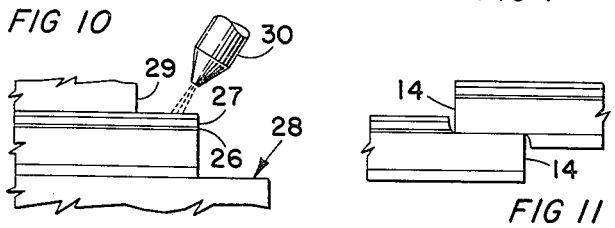

JAMES R. POWELL
HAROLD D. ROBERTS,
INVENTOR

BY Charles W. McHugh
AGENT

United States Patent Office 3,493,448
Patented Feb. 3, 1970

3,493,448
METHOD OF SPLICING PHOTOGRAPHIC FILM
James R. Powell and Harold D. Roberts, Dallas, Tex., assignors to LTV Electrosystems, Inc., Greenville, Tex., a corporation of Delaware
Filed May 31, 1968, Ser. No. 733,614
Int. Cl. B32b *31/20*
U.S. Cl. 156—73                                    6 Claims

ABSTRACT OF THE DISCLOSURE

A method of splicing photographic film with an ultrasonic welding apparatus including the steps of sandblasting the ends to be welded and chilling the fused ends while they are being compressed by the ultrasonic tool.

---

This invention relates to a method for splicing photographic film using ultrasonic energy to effect a base-to-base joint.

The high tensile strengths of oriented polyester sheets, for example, polyethylene terephthalate, has made such materials popular for a variety of applications, perhaps the most common of which is a base for photographic film. Of the sheets that are commercially marketed, one of the most widely known is that marketed by E. I. du Pont de Nemours & Co. under the trade name Mylar; and, for convenience herein, the name Mylar is frequently used as a shorthand way of referring to all such oriented materials. The high tensile strength of Mylar is achieved by stretching sheets of the material approximately 10% in its width direction and approximately 30% in its length direction while the material is held at somewhat about 300° F. The mechanical stretching aligns the molecules and produces excellent properties in the length and width directions, although rather unimpressive properties in the thickness direction. The material is cooled to room temperature while it is being held in tension so that substantially all of its strength is retained. If the unrestrained material is ever heated back to a temperature in excess of 300° F., the heat relaxes the mechanically induced orientation and causes the material to shrink; and, as might be expected, the material thereupon loses most of its strength.

Since oriented polyester film is sensitive to heat, it naturally would be hoped that adhesive joints would be a solution to the joining problem. Unfortunately, polyester films are not readily bonded by adhesive techniques to most materials, including themselves. It is suspected that this difficulty is the result of the material having what is sometimes referred to as a platelet-like molecular structure. One class of materials, of which polyurethane is an example, can, however, be bonded to Mylar. Hence, it has been common to employ as a substratum in photographic film, for example, a very thin layer of polyurethane (or a material which is chemically related to polyurethane), the substratum naturally being compatible with both the polyesther base and the emulsion which carries the light-sensitive materials. Thus, prior art joining techniques have had to contend with not only the base material but also the particular emulsion and substratum which is employed. The emulsion and substratum can, of course, be scraped off of the base to present a clean and bare surface on the ends of both pieces to be joined; but an adhesive joint of pure Mylar to pure Mylar—if obtainable at all—has not heretofore had the strength which was desirable. Therefore, such "cleaned" joints have usually been avoided heretofore in favor of making emulsion-to-emulsion or emulsion-to-base joints.

Because of the difficulty of achieving adhesive bonds, ultrasonic welding has been attempted with varying amounts of success. The basic technique of ultrasonic welding has been described by F. P. Alles in an article entitled "Ultrasonic Splicing of Polyethylene Terephthalate Films" published in December 1961, vol. 70 of the Journal of the Society of Motion Picture and Television Engineers. It is suspected that whatever success has been achieved with ultrasonic welding has been due, at least in part, to confining the heat-affected zone to a relatively small area, such that the thermal rise in the material as a whole is kept to a minimum. While the heat-affected (and therefore weakened) material has perhaps been minimized by the use of prior-art ultrasonic techniques, it is believed that such previously employed techniques can never completely eliminate the effects of re-heating some of the material back to the temperature at which it was manufactured.

The joints or splices which have been achieved in photographic film in the past, wherein some emulsion is deliberately left between two overlapping pieces of base material, have been reported to be from 65 to 100 percent of the strength of the original material. Attempts to experimentally reproduce such reported results, however, have resulted in far more joints near the 65% end of the range than near the 100% end. Too, for some unknown reason, the results have sometimes been erratic, such that identical machine settings, etc., produced a weld in some cases and produced no weld in others. The inability to consistently reproduce high-strength joints with at least some emulsion trapped between two pieces of base material raises the inference that the emulsion itself, or dirt, or other impurities carried by the emulsion, has a deleterious effect on the finished joint. Hence the ironical situation apparently existed in the past that at least some emulsion was necessary to produce any joint at all, but the presence of the emulsion in the finished joint eventually led to fatigue failure at the joint, if a tensile failure did not occur first.

It is believed that very few persons, if any, recognized the fact that it is apparently the emulsion on photographic film that contributes to the inability to repeatedly make good welds or splices. Thus, the few publications that have described ultrasonic splicing techniques have either been silent on the presence of the emulsion or merely stated that a cleaning step to remove the emulsion is "unnecessary." As will be explained hereinafter, however, it has been found that better welds can be achieved if the emulsion and substratum are first removed from photographic film than can be achieved when these materials are left in place.

Accordingly, it is a major object of the invention to provide a method of splicing photographic film without the aid of any emulsion material.

Another object is to provide a novel ultrasonic welding technique.

A further object is to provide a method of splicing photographic film wherein the splice is stronger than the base material.

Other objects and advantages will be apparent from the specification and claims and from the accompanying drawing illustrative of the invention.

In the drawing,

FIGURE 5 is a time-temperature plot of a segment of the material being welded in accordance with the invention;

FIGURE 6 is a time-temperature plot of a segment of material being welded in accordance with prior art welding methods;

FIGURE 7 is a graphical representation of the sequence through which a given small section of the materials pass as they are welded;

FIGURE 10 is a diagrammatic representation of a segment of film in a jig; and

FIGURE 11 is a diagrammatic representation of two pieces of film stacked in preparation for welding.

Figure 1:
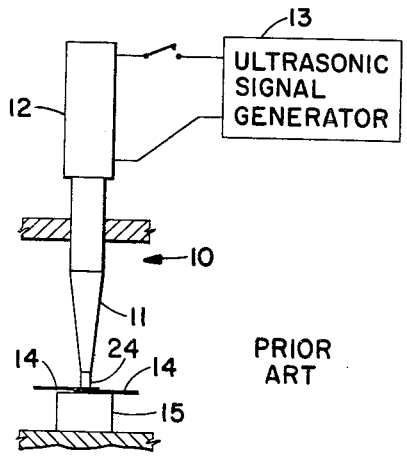
FIGURE 1 is a diagrammatic representation of an ultrasonic welding apparatus which is typical of the prior art.

With initial reference to FIG. 1, an ultrasonic welding apparatus 10 arranged in accordance with prior practice is shown diagrammatically. The apparatus includes a welding tool 11 which is caused to oscillate along its longitudinal axis by the transducer 12 affixed to the top of the tool. The transducer 12 receives energy from a source such as the ultrasonic signal generator 13 and converts it into linear movements which are transferred to the tool 11 in a well-known manner. During downward excursions of the tool 11, the overlapped ends of the pieces of film 14, 14 are repeatedly compressed against the rigidly supported anvil 15, such that sufficient heat is imparted to the pieces to fuse them together. The workpieces 14, 14 are typically moved as a unit with respect to the tool 11 with the aid of a table or the like (not shown) which travels beneath the tool at a known rate.

Figure 2:
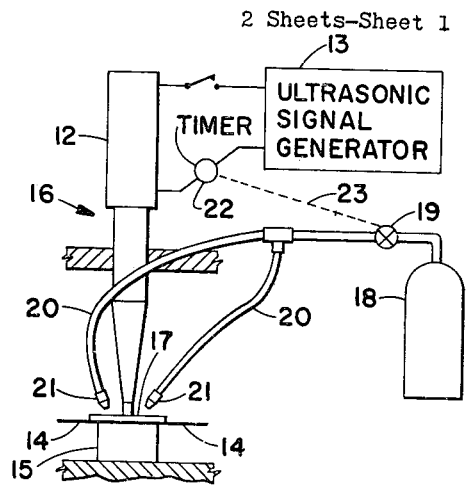
FIGURE 2 is a diagrammatic representation of an ultrasonic welding apparatus arranged in accordance with a preferred embodiment of the invention.

With reference to FIG. 2, a welding apparatus 16 constructed in accordance with the teachings herein includes substantially the same elements as those shown in FIG. 1, but with added elements for chilling the workpieces at the conclusion of an excursion of the tool tip against the workpieces while said workpieces are still being compressed by the tool tip. These added elements may, of course, take most any reasonable form, but it has been found most convenient to employ a heat-conductive element 17 (such as copper shim) which is placed in contact with the lapped workpieces 14, 14 together with a means for chilling the exposed surface of the shim. A convenient chilling means has been found to be a conventional bottle of carbon dioxide 18, pressurized initially to about 650 p.s.i., with a suitable valve 19 which controls the passage of $CO_2$ through suitable tubes 20 and nozzles 21 that direct the gas directly onto the shim 17. The nozzles 21 have orifices that are suitably sized so that cooling (which is caused by expansion of the pressurized gas) occurs at the orifices and not at the valve 19.

A timer 22 and a suitable connection represented by the broken line 23 are employed, if desired, to achieve what may be described as a substantially automatic welding process, wherein the welding energy is imparted to the workpieces in timed relation to the discharge of gas onto the work area. Since the load-carrying capacity of a splice in photographic film is dependent almost entirely on the load-carrying capacity of the base (assumed for the present to be Mylar), it will be more meaningful to first examine the method of welding bare Mylar, and subsequently to look at welding Mylar when it exists as a base for photographic film.

Figure 3:
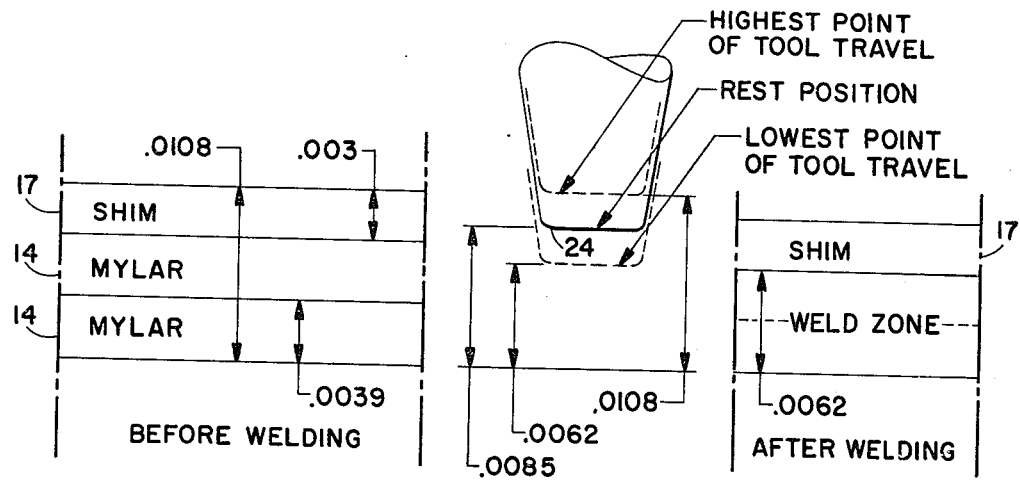
FIGURE 3 is an enlarged elevation view of small segments of the materials being welded, with the various tool positions being shown for reference purposes.
Figure 4:
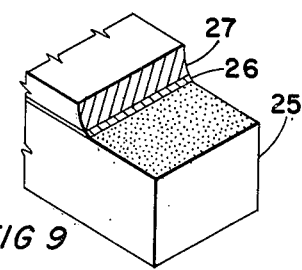
FIGURE 4 is a cross-sectional view of a joint representative of those achieved with the invention.

In operation of the apparatus 16, the height of the tool tip 24 is preferably adjusted so that its neutral or "at rest" height is slightly less than the stacked height of the pieces of material to be welded 14, 14 plus the heat-conductive element 17. An example of a suitable adjustment is graphically portrayed in FIG. 3, wherein two pieces 14, 14 of Mylar are shown with a copper shim 17 measuring 0.003 inch placed in contact with the top surface of the stacked Mylar. The thickness of the shim 17 is not critical, but it must be measured in order to initially adjust the tool to a suitable height. The left portion of the figure represents the stacked height of small segments of the elements 14, 14 and 17 before welding is commenced, and the right portion represents the same segments after welding. Examination of the welded pieces 14, 14 after welding would likely reveal a cross-section like that shown in FIG. 4.

The period of actual welding is typically established by keeping the tool 11 fixed and moving the film pieces 14, 14 beneath it. Thus, the film pieces 14, 14 are usually placed in a jig so that their ends overlap an appropriate distance, e.g., 0.030 inch, and then the jig is attached to a movable table or anvil which is programmed to move underneath the tool 11 at the proper time. The rate of travel of the table or anvil 15 beneath the tool 11 of course determines about how many cycles of compression and relaxation that given segments of the workpieces 14, 14 will experience. Table travel is typically set at about one-half inch per second, and the signal generator 13 usually produces a signal having a frequency of about 20,000 cycles per second; hence, it is believed that each small segment of the pieces 14, 14 experiences from several hundred to a few thousand compression cycles, depending on the size of the tool tip 24.

It is, of course, the repeated compression and relaxation of the workpieces 14, 14 underneath the oscillating tool tip 24 that introduces heat into the pieces, such that eventually they become fused together. Such a heating step is obviously old; but what has heretofore not been taught is the step of chilling or quenching the fused portions of the workpieces while said portions are still under compression. This is accomplished by continuously removing heat from the workpieces 14, 14 including that time during which compression is adding heat to the workpieces, so that the fused portions are immediately chilled at the end of a compression step.

It has been found convenient to effect the required cooling by directing a jet of cooling gas onto the weld zone, although other cooling means could probably be employed with equal success. For example, an anvil could be provided with a chamber through which a cooling liquid is circulated, much like the water jacket through which water is circulated in a familiar internal combustion engine. If a cooling chamber could be included in the tool tip 24 without altering the resonance characteristics of the tool 11, filling such a chamber with a liquid at cryogenic temperatures would also be a satisfactory manner of chilling the workpieces at the conclusion of a compression cycle. However, an apparatus 16 which includes the simple shim 17 and a gas bottle 18, has been found to be convenient to use, and is much more economical to assemble than would be a special jacketed anvil, etc.

To insure that the chilling will begin immediately after the first heating cycle is complete, it is advisable to direct sufficient cooling gas onto the shim 17 to chill the shim and the workpieces before any actual welding is begun. If $CO_2$ is employed for cooling, a flow rate of about 2 liters per second (at atmospheric pressure) against the shim 17 (which is sufficient to cause frost to immediately appear on the shim and which is maintained for about three seconds) has been found to be quite satisfactory. It should be apparent, however, that if a material other than copper is employed as the heat-conducting element 17, an alteration in initially chilling or "soaking" time might be required, the change in time being proportional to the difference in the thermal conductivity of copper and the substituted material.

The initial cooling or soaking of the workpieces is represented in the left-hand portion of FIG. 5. When the tool tip 24 compresses the overlapped workpieces 14, 14 the first time, a certain amount of heat will be generated within the workpieces, and the time-temperature curve will have an upward slope. The exact amount of heat imparted to the workpieces during a single compression cycle is not readily susceptible to measurement, so the curve in FIG. 5 has been left dimensionless in order to avoid giving the impression that precise information is available on what happens during a given one of the thousands of cycles. Based on the heating and cooling means provided, however, it can be concluded that the time-temperature curve of the workpieces would have the peaks and valleys shown in FIG. 5 during the welding operation. The appreciable difference between the welding method taught herein and prior art methods can be recognized when FIG. 5 is compared with prior welding techniques depicted in FIG. 6.

Like the exact amount of heat added during a single compression cycle, the exact maximum temperature that the workpieces reach during heating is not known with certainty. It is reported, however, that Mylar melts (using the term very broadly) somewhere above 450° F. at atmospheric pressure. Hence a joint between two pieces of Mylar that has been achieved with ultrasonic welding has almost certainly been at or near a temperature of about 450° F. Thus, it has been exposed to temperatures appreciably in excess of that temperature which is slightly above 300° F. and at which breakdown of the previously induced molecular orientation begins to occur. The fact that the maximum temperature is not known with certainty is of no consequence, however, since it is known that welds are achievable with welding devices that are commercially available when such devices are combined with a chilling means in accordance with the teachings herein. Those skilled in the art will find no difficulty, therefore, in applying the teachings herein.

While the peaks and valleys of the time-temperature curve of FIG. 5 cannot be assigned precise values with any assurance, the basis on which the curve is drawn is supported by examination of what happens to a small segment of the workpieces 14, 14, as they pass through the weld zone, shown in FIG. 7. The first contact between the tool tip 24 and the stacked elements 14, 14, 17 is made when the stacked elements are, in this example, about 0.0108 inch high. As the tool tip 24 reaches the lowest point of its oscillations, the Mylar pieces have been compressed to a combined height of about 0.0032 inch. The copper shim 17 is relatively rigid compared to the Mylar, and any compression in it can be disregarded as negligible. At the end of the first compression stroke, it is believed that the resiliency in the Mylar pieces 14, 14 will cause them to spring back to very near their original height as the tool tip 24 is withdrawn. That is, it is practically certain that the first compression cycle does not impart enough heat to bring the interface to a fusion temperature; and there is little reason to suspect that much—if any—permanent set is imparted to the materials in the first cycle. When the pieces 14, 14 begin to rebound at the end of each compression stroke (as the tool starts its upward movement), the chilling effect of the continuously flowing and cold $CO_2$ gas is realized, and, it is believed, the respective molecular structure of each of the pieces is restrained from taking on a random orientation, i.e., it is "fixed," while the pieces are still under compression. The tool 11 has been observed to follow what appears to be a nearly perfect sinusoidal path in moving between its highest and lowest points of travel, so that the first compression cycle is repeated in the plurality of cycles which follow.

The last compression cycle to which segments of the pieces 14, 14 are subjected, compresses them and the shim 17 to the same depth as the first cycle, but the thousands of repetitive compression steps (with the attendant heat) eventually introduce a permanent set in the pieces, and the last upward movement of the tool 11 leaves the final height of the welded Mylar pieces at about 0.0062 inch. Such a thickness in the welded joint is not so much greater than the original thickness as to pose an obstacle in many applications; but it should be apparent that the final thickness could be reduced by such steps as, for example, lengthening the weld time so as to increase the number of compression cycles to which each segment is subjected, etc.

The strength of joints achieved when the chilling step described herein is employed has been found to exceed the original tensile strength of Mylar sheet. Testing of the joints has always produced failures well outside of the weld zone, so that it may be concluded that not only is a sound joint consistently produced but also weakening of material adjacent the weld zone (a problem which is very pronounced in prior art welds) is reduced if not eliminated. This benefit can be more fully realized by making the shim larger in area than that portion of the tool tip which bears against the shim, so that the shim extends beyond the tool and cools an area appreciably larger than the weld zone. Furthermore, cooling the material adjacent the weld zone so as to keep the heat-affected region small, makes possible relatively large power inputs when desired, e.g., on the order of 300 watts, as compared with 50–100 watts input in most reported devices.

Having examined a welding process for bare Mylar, a process for welding or splicing photographic film will now be described. Photographic film usually has, in ascending order, a base of Mylar (which comprises about ¾ of the film thickness), a substratum such as a polyurethane resin, an emulsion carrying silver halide particles, and a final gelatin overcoat; beneath the base is frequently an antihalation coating to prevent any light which passes through the transparent base from reflecting back into the light-sensitive emulsion. The most widely known and commercially available film is perhaps DuPont's Cronar film. This film is said by one source to employ an oriented polyester base other than Mylar and a substratum other than polyurethane; but if such other materials are indeed employed, they are so closely related, respectively, to Mylar and polyurethane that relatively simple laboratory tests will not distinguish between the materials. Perhaps more significant with respect to the instant disclosure, the Cronar base behaves like Mylar when it is being welded. Hence, for the purposes of teaching a method of joining film strips, any difference that in fact exists between Mylar and the Cronar base can be disregarded, and a technique that is applicable for pure Mylar will be understood to be applicable for Cronar also.

As suggested earlier, it is believed that much stronger bonds are achieved in photographic film when all of the emulsion is first removed so that a bond is achieved between the base material of the respective pieces, with no impurities to contribute to immediate or subsequent failure. In the past, there have been two known ways of removing emulsion, i.e., to chemically remove it and to scrape it off with a knife or the like. The chemical technique utilizes any known solvent for the emulsion, including, for example, a commonly known household bleach such as Clorox, to dissolve the emulsion and wash it away from the base. Wicking is a problem with this technique, however, and a sharp boundary in the remaining emulsion is difficult to obtain. Scraping the emulsion off with a knife can produce a sharp boundary, but it almost inevitably results in scratches that are believed to lead to premature failure. That is, Mylar joints made with materials having scraped surfaces have been experimentally found to exhibit poor fatigue properties, and it is believed that the scratches are a major contributor to observed failures.

It has been found, however, that the emulsion can be removed with no deleterious effects by sandblasting it off of the base. A convenient apparatus for accomplishing this is an abrasive unit such as the Model C sold by S. S. White Dental Manufacturing Co., New York, N.Y., a unit which is traditionally sold to dentists for laboratory work, preparing cavities for subsequent filling, etc. Using abrasive powder such as aluminum oxide having an average particle size of about 50 microns, and a propelling gas at an operating pressure of about 75 p.s.i., the emulsion is readily eaten away when a nozzle directing the blast is moved over the material about as fast as a person moves a pencil in writing his signature on paper. The duration of the blast is not what might be described as critical, however, since the Mylar is resilient enough to yield to some extent under a continuous blast, and it is not readily removed. The gelatin emulsion, though not what one would probably describe as "brittle," is more brittle than Mylar, and is easily removed by the sand blast, as is the substratum. Adequate removal of the unwanted materials can be determined by inspection of the base which takes on a frosty appearance much like ground glass when the sand blast has removed all of the unwanted materials and then has impinged directly on the bare Mylar for a brief period.

Figures 8, 9:
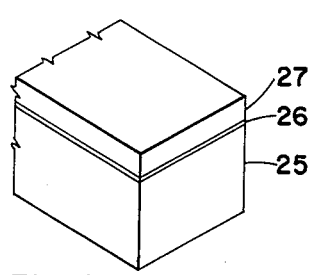
FIGURE 8 is an isometric view of a small segment of photographic film before the gelatin is stripped off in preparation for welding.
FIGURE 9 is an isometric view of the film segment shown in FIG. 8 after the segment has had its gelatin top coat removed by sandblasting.

FIG. 8 represents a segment of photographic film in which the three principal components are shown, viz, the base 25, the substratum 26, and the light sensitive emulsion 27. For convenience, the film can be advantageously clamped in a jig 28 (FIG. 10) in which only that portion to be stripped is exposed, the remainder of the film being protectively covered by a plate 29. A nozzle 30 which directs the abrasive-laden stream of gas at a velocity of around 1000 feet per second is then manually guided over the exposed film to remove the substratum 26 and emulsion 27, which leaves the film with a configuration like that shown in FIG. 9. When the gas-abrasive mixture is adjusted to provide a rate of consumption of about 5 grams of abrasive per minute, the blast can usually strip the emulsion in one pass when moved at about ¼ inch per second.

Although the sandblasting method described above differs somewhat from that which is described in U.S. Patent No. 2,696,049 entitled "Method of and Apparatus for Cutting Tooth Structure by Means of an Abrasive-Laden Stream of Gas," the general principles of using a miniturized sand blasting apparatus are satisfactorily described in the patent; hence, it may be beneficial to some as an item of general reference.

When photographic film having the aforementioned antihalation backing is to be spliced, the mating surfaces of the respective ends should be stripped, if a joint whose strength is as high as possible to be obtained. That is, the gelatin emulsion on the top of one piece of film and the gelatin emulsion on the bottom of the other piece of film should be stripped, and then the cleaned surface should be stacked as shown in FIG. 11 and subsequently placed beneath the ultrasonic tool tip.

While the welding method described herein has been particularly directed to the problems of welding film having an oriented polyester base, it should be obvious that the technique would be equally advantageous for joining any plastic whose properties are largely attributable to an oriented molecular structure. Similarly, only one embodiment of the apparatus for making welds has been described in detail herein and shown in the accompanying drawing; but it will be evident that various modifications are possible in the arrangement and construction of its components without departing from the scope of the invention.

What is claimed is:
1. The method of splicing photographic film having a molecularly oriented plastic material for the base, said method utilizing an ultrasonic welding apparatus having an oscillating tool tip, comprising the steps of:
   preparing respective ends of the film by removing emulsion from the base by sandblasting;
   placing prepared ends in overlapping relation between the tool tip and an anvil;
   compressing the film ends together utilizing the oscillating tool tip so as to introduce heat into the film ends to the extent that at least certain portions thereof become fused; and
   chilling the fused portions of the film before the tool tip is moved away from the film and while said portions are still under compression.

2. The method of splicing photographic film described in claim 1 wherein the chilling step is accomplished by flowing sufficient cooling gas onto the weld zone to chill the film ends before oscillation of the tool tip is commenced, and maintaining said flow of gas throughout the time that the tool tip is compressing the ends.

3. The method of splicing photographic film described in claim 1 wherein the chilling step is accomplished by permitting pressurized $CO_2$ to be vented to the atmosphere adjacent the fused portions of the film at a flow rate of about 2 liters per second.

4. The method of splicing photographic film claimed in claim 1 wherein sandblasting is accomplished using grit having a particle size of about 50 microns and using propelling gas at about 75 p.s.i.

5. The method of splicing photographic film claimed in claim 1 wherein chilling is accomplished by placing a heat conductive element between the tool tip and the film ends by directing a cooling gas onto the heat conductive element immediately adjacent the tool tip.

6. The method of splicing phootgraphic film claimed in claim 5 wherein chilling is accomplished by continuously directing a cooling gas onto the heat conductive element during excursions of the tool against the film ends.

References Cited

UNITED STATES PATENTS

| | | | |
|---|---|---|---|
| 3,146,141 | 10/1961 | Woodland | 156—580 X |
| 3,242,029 | 3/1966 | Deans | 156—73 XR |
| 3,331,719 | 7/1967 | Soloff | 156—73 |
| 3,419,447 | 12/1968 | Hewitt | 156—580 X |
| 3,443,277 | 5/1969 | Frielingsdorf | 156—73 XR |

CARL D. QUARFORTH, Primary Examiner

ARTHUR J. STEINER, Assistant Examiner

U.S. Cl. X.R.

156—49, 157, 580